July 5, 1932.  C. L. BRYANT  1,865,672
CONTROL DEVICE
Filed Nov. 14, 1930
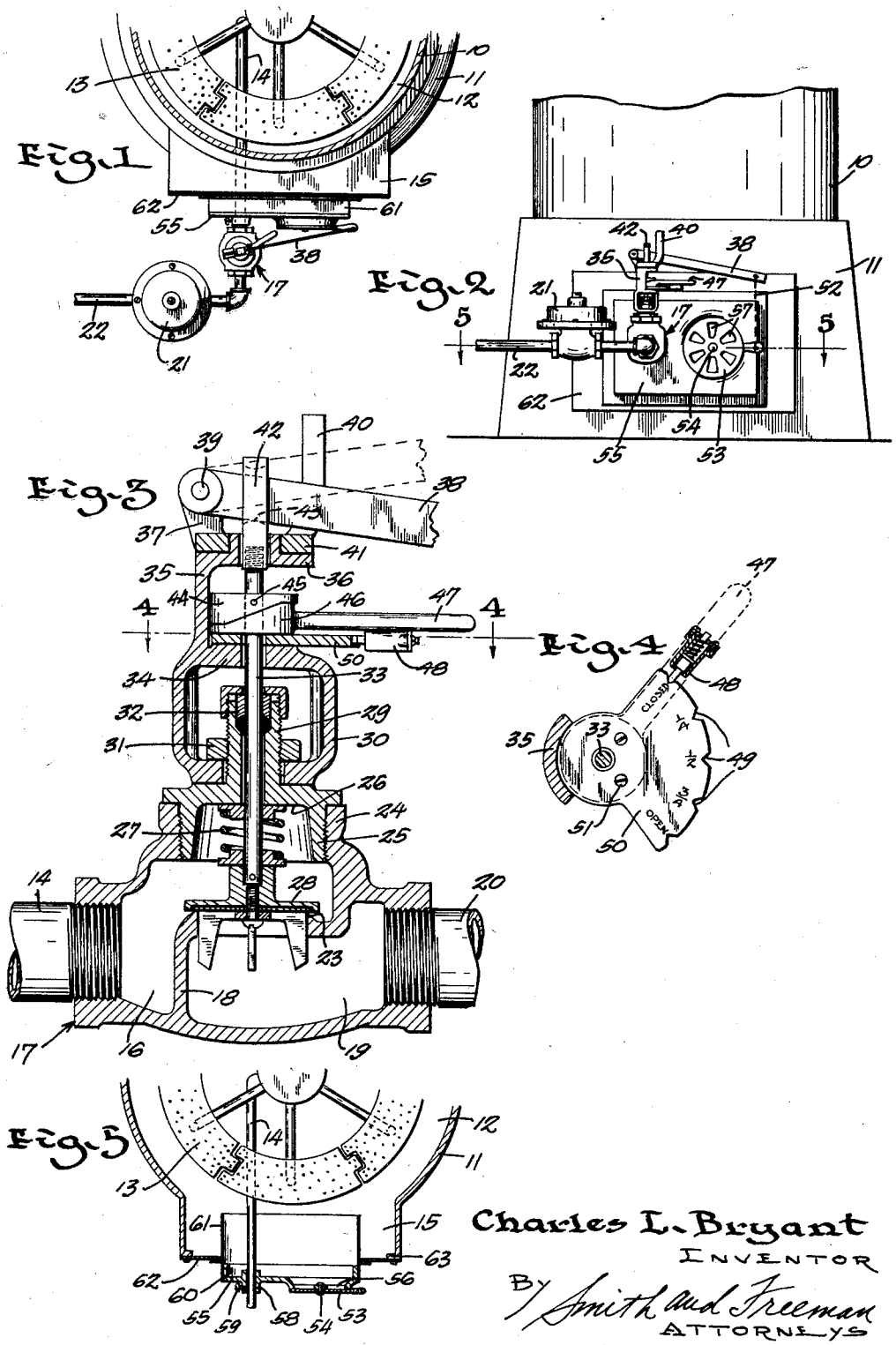
Charles L. Bryant
INVENTOR
By Smith and Freeman
ATTORNEYS Patented July 5, 1932

1,865,672

UNITED STATES PATENT OFFICE

CHARLES L. BRYANT, OF CLEVELAND, OHIO, ASSIGNOR TO C. L. BRYANT CORPORATION, OF CLEVELAND, OHIO, A CORPORATION OF OHIO

CONTROL DEVICE

Application filed November 14, 1930. Serial No. 495,690.

This invention relates to control devices for heaters and has for an object the provision of new and improved devices of this character.

In the drawing accompanying this specification and forming a part of this application I have shown, for purposes of illustration, one form which my invention may assume, and in this drawing:

Figure 1 is a fragmentary horizontal sectional view taken through the combustion chamber of a furnace, and disclosing a plan view of an embodiment of the invention, Figure 2 is a fragmentary elevational view of said furnace, and of said embodiment.

Figure 3 is an enlarged fragmentary vertical sectional view of a fuel control valve employed in said embodiment, Figure 4 is a horizontal sectional view corresponding to the line 4—4 of Figure 3, while Figure 5 is a horizontal sectional view corresponding to the line 5—5 of Figure 2.

The embodiment herein shown comprises a furnace 10 having a fire-box 11, providing a combustion chamber 12, in which is mounted a gas burner 13, supplied with gaseous fuel through a conduit 14 extending outwardly through an opening 15 of the fire-box 11, and communicating with an outlet chamber 16 of a valve means 17, separated by an angular partition 18, from an inlet chamber 19, to which gas is supplied from the pipe 20, the latter communicating with a pressure regulator 21 connected to a source of supply by a pipe 22, and said partition has a valve seat 23 affording communication between the chambers 16 and 19. The casing of the valve means 17 is also provided with a threaded boss 24 for the threaded reception of a fitting 25, having a wall 26 the lower surface of which provides a bearing for one end of a spring 27 the opposite end of which bears upon a valve 28 normally closing the valve opening 23, while the opposite surface of the wall 26 is provided with a threaded boss 29 projecting into a surmounting cage 30 and provided with a nut 31 holding said cage in position, and also provided with a stuffing box 32, surrounding an operating stem 33 secured to the valve 28, and extending upwardly through and beyond the wall 34 of the cage 30, the latter also provided at one side with a vertically extending wall 35 and an upper horizontally extending wall 36 spaced from the wall 34, carrying a pair of upstanding ears 37 between which a lever 38 is pivotally mounted, as at 39, said lever extending between forked members 40 formed upon a plate 41 supported by the wall 36 of the cage. Attached to the upper end of the stem 33, and adapted for sliding movement through a suitable slot in the wall 36, is a connector 42 having an opening disposed about the lever 38, the walls of said opening being rounded as indicated at 43.

Between the walls 34 and 36 the stem 33 is provided with a cam member 44 affixed to the stem by a pin 45, and cooperating with the cam member 44 is a second cam member 46 surrounding said stem and having a handle 47 provided with a latch 48 adapted to engage various notches 49 of a quadrant 50 fixed to the wall 34 by screws 51.

The lever 38 at its outer end is connected by a flexible member 52 to an extension formed upon a shutter 53 rotatably supported as at 54 by a plate 55, the latter provided with openings 56 to correspond to the openings 57 of the shutter 53, the shutter 53 being normally held under the influence of gravity in position to entirely close the openings 56 in the plate 55. The plate 55 may also have a boss 58 for the passage of the pipe 14, and may be secured to said pipe 14 by a set screw 59. The plate 55 also has a flange 60 fitting into and secured to a boxlike member 61 slidably inserted into a closure wall 62, preferably of sheet metal, which in turn is secured as at 63 to the edges of the fire-box 11 so as to close the opening 15 thereof.

In operation, assuming the handle 47 to be in the position marked "closed" in Figure 4, the valve 28 and shutter 53 will be entirely closed; when it is desired to operate the burner 13 the handle 47 is moved along the quadrant 50 and the latch 48 engaged with any one of the notches 49, this movement of the handle 47 effecting rotation of the cam member 46, elevation of the cam member 44, elevation of the stem 33, and opening of the valve 28, permitting passage of gas into the chamber 19, through the valve opening 23, into the chamber 16, and through the pipe 14 to the burner 13. Elevation of the stem 33 effects a corresponding movement of the lever 38, which in turn opens the shutter 53 so as to supply air to the combustion chamber 12 and burner 13 in an amount proportioned to the amount of gas supplied to said burner, and thus effecting economical and efficient operation. Movement of the handle 47 to a different position with reference to the quadrant 50 either cuts down or increases the supply of gas to the burner 13 and in each case the shutter 53 is automatically changed in position to supply a proportionate amount of air commensurate with the amount of fuel supplied, thereby automatically changing the quantity of air supplied to the combustion chamber whenever the amount of fuel supplied to the burner 13 is changed, and thus economically and efficiently proportioning the amount of air to the quantity of fuel and to the intensity of combustion.

The box-like member 61 and plate 55 are made adjustable with respect to the closure wall 62 so that the valve means 17 and operating lever 38 may always be placed in correct position with respect to the shutter 53, thus enabling all parts to be made in standard sizes and still be suitable for application to various sizes and types of furnaces.

It will be apparent to those skilled in the art that the embodiment herein disclosed accomplishes at least the principal object of the invention, and it will also be apparent that various uses and advantages not herein particularly referred to are inherent in said invention; furthermore, various changes and modifications may be made without departing from the spirit of the invention; and accordingly the disclosure herein is illustrative only and the invention is not limited thereto.

I claim:

1. A device of the character described having a combustion chamber and a burner therein, valve means for supplying fuel to said burner and having a valve and a valve stem movable therewith, a lever operably connected to, and movable with, said stem, cam means for moving said stem and valve, to adjust the quantity of fuel supplied to said burner, thus to vary the intensity of combustion, a handle connected to said cam means for operating said cam means, a quadrant cooperable with said handle and having a plurality of positions thereon, a latch carried by said handle and engageable with said quadrant at any of said positions, and air supply means actuable by movement of said lever for admitting a quantity of air to said combustion chamber proportionate to any of the adjusted amounts of fuel supplied to said burner and in each case sufficient to properly support combustion in said chamber.

2. A furnace comprising: a fire-box having a laterally disposed opening, and a burner therein, means outside of said fire-box and adjacent said opening for supplying fuel to said burner, means for adjusting the quantity of fuel supplied to said burner, thus to vary the intensity of combustion, a closure attached to the fire-box for closing the opening in said fire-box, a box-like member laterally adjustable with reference to said closure and with reference to said fuel supplying means, and air supply means carried by said box-like member actuable by said adjusting means for admitting a quantity of air to said combustion chamber proportionate to any of the adjusted amounts of fuel supplied to said burner and in each case sufficient to properly support combustion in said fire-box.

3. A device of the character described having a combustion chamber and a burner therein, valve means for supplying fuel to said burner and having a valve and a valve stem movable therewith, a lever operably connected to, and movable with, said stem, cam means for moving said stem and valve, to adjust the quantity of fuel supplied to said burner, thus to vary the intensity of combustion, a handle connected to said cam means for operating said cam means, a quadrant cooperable with said handle and having a plurality of positions thereon, a latch carried by said handle and engageable with said quadrant at any of said positions, and air supply means comprising an oscillatable shutter actuable by movement of said lever for admitting a quantity of air to said combustion chamber proportionate to any of the adjusted amounts of fuel supplied to said burner and in each case sufficient to properly support combustion in said chamber.

4. A furnace comprising: a fire-box having a laterally disposed opening, and a burner therein, valve means outside of said fire-box and adjacent said opening for supplying fuel to said burner and having a valve and a valve stem movable therewith, a lever operably connected to and movable with said stem, cam means for moving said stem to adjust the quantity of fuel supplied to said burner, a quadrant, a handle for operating said cam means and having a latch engageable at different positions with respect to said quadrant for holding said handle in adjusted positions, a closure attached to said fire-box for closing the opening in said fire-box, a box-like member laterally adjustable with reference to said closure and to said valve means, and air supply means carried by said box-like member actuable by said lever for admitting a quantity of air to said combustion chamber proportionate to any of the adjusted amounts of fuel supplied to said burner and in each case sufficient to properly support combustion in said chamber.

In testimony whereof I hereunto affix my signature.

CHARLES L. BRYANT.